United States Patent
Miller et al.

(10) Patent No.: US 9,680,796 B2
(45) Date of Patent: Jun. 13, 2017

(54) ASSET MANAGEMENT VIA VIRTUAL TUNNELS

(71) Applicant: Lantronix, Inc., Irvine, CA (US)

(72) Inventors: Daryl R. Miller, Irvine, CA (US); David L. Wagstaff, Irvine, CA (US)

(73) Assignee: Lantronix, Inc., Irvine, CA (US)

( * ) Notice: Subject to any disclaimer, the term of this patent is extended or adjusted under 35 U.S.C. 154(b) by 0 days.

(21) Appl. No.: 15/349,844

(22) Filed: Nov. 11, 2016

(65) Prior Publication Data

US 2017/0063788 A1    Mar. 2, 2017

Related U.S. Application Data

(63) Continuation of application No. 14/936,943, filed on Nov. 10, 2015, now Pat. No. 9,521,121, which is a continuation of application No. 14/793,522, filed on Jul. 7, 2015, now Pat. No. 9,215,216, which is a continuation of application No. 13/457,930, filed on Apr. 27, 2012, now Pat. No. 9,104,993.

(60) Provisional application No. 61/480,350, filed on Apr. 28, 2011.

(51) Int. Cl.
| | |
|---|---|
| *G06F 15/173* | (2006.01) |
| *H04L 29/06* | (2006.01) |
| *H04L 12/46* | (2006.01) |
| *G06Q 10/06* | (2012.01) |
| *H04L 12/26* | (2006.01) |
| *G06Q 10/08* | (2012.01) |

(52) U.S. Cl.
CPC ......... *H04L 63/0236* (2013.01); *G06Q 10/06* (2013.01); *G06Q 10/087* (2013.01); *H04L 12/4633* (2013.01); *H04L 29/06625* (2013.01); *H04L 43/12* (2013.01); *H04L 63/029* (2013.01); *H04L 63/0272* (2013.01)

(58) Field of Classification Search
CPC .................................................... H04L 63/0272
USPC ......................................................... 709/224
See application file for complete search history.

(56) References Cited

U.S. PATENT DOCUMENTS

| | | | |
|---|---|---|---|
| 7,444,415 B1 * | 10/2008 | Bazzinotti | H04L 12/4641 709/217 |
| 7,502,672 B1 * | 3/2009 | Kolls | G06Q 30/02 340/988 |
| 8,013,732 B2 * | 9/2011 | Petite | G01D 4/004 340/3.1 |
| 8,392,998 B1 * | 3/2013 | Schrecker | H04L 63/1416 709/224 |
| 8,904,506 B1 | 12/2014 | Canavor | |
| 2005/0076142 A1 * | 4/2005 | Chin | H04L 12/4641 709/245 |
| 2006/0190458 A1 * | 8/2006 | Mishina | H04L 67/125 |

(Continued)

*Primary Examiner* — Hamza Algibhah
(74) *Attorney, Agent, or Firm* — Rutan & Tucker LLP; Hani Z. Sayed

(57) ABSTRACT

An asset management system is presented. The management system includes monitoring devices able to provide asset data across firewalls without requiring reconfiguration of the firewalls. The asset data pass through a forwarding service that instantiates a virtual tunnel comprising a communication channel between the monitoring devices and remote asset management engines. The asset management engines can also be located behind firewalls. As the management engines aggregate asset data, the engines can present one or more alerts via a management interface.

26 Claims, 5 Drawing Sheets

(56) References Cited

U.S. PATENT DOCUMENTS

| | | | |
|---|---|---|---|
| 2007/0100998 A1* | 5/2007 | Ramadan | H04L 63/02 709/225 |
| 2007/0118653 A1 | 5/2007 | Bindal | |
| 2007/0239569 A1* | 10/2007 | Lucas | G06Q 10/08 705/28 |
| 2008/0201486 A1* | 8/2008 | Hsu | H04L 29/06 709/238 |
| 2009/0125633 A1* | 5/2009 | Watsen | H04L 63/029 709/229 |
| 2009/0141741 A1* | 6/2009 | Kim | H04L 29/12943 370/474 |
| 2009/0313687 A1 | 12/2009 | Popp | |
| 2010/0141435 A1* | 6/2010 | Breed | G06Q 10/06 340/539.13 |
| 2010/0226346 A1 | 9/2010 | Caldwell | |
| 2011/0277028 A1* | 11/2011 | Piazza | H04L 63/0209 726/11 |
| 2011/0302629 A1* | 12/2011 | Whitson | G06F 21/6218 726/3 |
| 2012/0079567 A1 | 3/2012 | Van De Groenendaal | |
| 2012/0105214 A1* | 5/2012 | Sanders | H04L 67/327 340/10.42 |
| 2012/0144203 A1 | 6/2012 | Albisu | |
| 2012/0166249 A1* | 6/2012 | Jackson | G05B 19/41865 705/7.28 |
| 2012/0180021 A1 | 7/2012 | Byrd | |
| 2012/0254949 A1 | 10/2012 | Mikkonen | |
| 2013/0116952 A1* | 5/2013 | Chai | H04Q 9/00 702/61 |
| 2013/0159195 A1 | 6/2013 | Kirillin | |

\* cited by examiner

ASSET MANAGEMENT VIA VIRTUAL TUNNELS

This application is a continuation of U.S. patent application Ser. No. 14/936,943, filed on Nov. 10, 2015, which is a continuation of U.S. patent application Ser. No. 14/793,520, filed on Jul. 7, 2015, now U.S. Pat. No. 8,215,216, which is a continuation of U.S. patent application Ser. No. 13/457,930, filed Apr. 27, 2012, now U.S. Pat. No. 9,104,993, all of which claim the benefit of priority to U.S. provisional application having Ser. No. 61/480,350 filed on Apr. 28, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is asset management technology.

BACKGROUND

Remote management of assets (e.g., products, goods, fuel, resources, etc.) can be quite problematic especially when a manager does not have direct access to asset data. Consider the fuel distribution industry as an example where gasoline is stored in underground tanks located at gas stations and gasoline is delivered via tanker trucks. A fuel distribution company could use the station's tank information to determine how best to deliver fuel to the stations, but does not have direct access to a station's gasoline inventory or tank levels. Some stations utilize automatic tank gauges to monitor tank levels and provide such information to a station operator. Unfortunately, the fuel distribution company does not have access to such information, even if it is in electronic form, because the data is typically located behind a firewall under control of a third party; a station owner for example, rather than the distribution company. Further, the distribution company's management interfaces could be located behind a firewall, which increase the difficulty of exchanging data. The circumstances of accessing asset data are similar with respect to distribution or management of other types of asset; groceries, inventories, resources, sensor data, or other types of assets.

Others have put forth effort to monitor or manage assets. For example, U.S. Pat. No. 7,554,441 to Viegers et al. titled "system and Method for Real-Time Management of Mobile Resources", filed Oct. 16, 2006, describes using sending sensor data through wireless communication networks from mobile resources (i.e., vehicles) to a data center. Viegers is useful for monitor vehicles, but fails to provide insight into asset management.

U.S. Pat. No. 6,128,551 to Davis et al. titled "Method and Apparatus for Management of Automated Fuel Delivery System", filed Jul. 2, 1998, makes further progress. Davis describes monitoring and delivering fuel to vehicles, and communicating fuel tank sensor data to a central control unit, which allows for fuel inventory management. Unfortunately, Davis lacks any indication of how to obtain asset status information or other asset data when the asset data is located behind a firewall.

Further progress is described in U.S. patent application publication 2010/0023162 to Gresak et al. titled "Method, System and Components for Operating a Fuel Distribution System with Unmanned Self-Service Gasoline Stations", filed as an international application on Dec. 8, 2004. Gresak discusses coordinating fuel delivery from supply vehicles to gasoline stations. Although Gresak describes a more substantial fuel management system, Gresak also fails to address obtaining asset information that is located behind a firewall.

U.S. patent application publication 2003/0050808 to Mor titled "System, Method and Computer Program Product for an Electronic Mail VPN in a Supply Chain Management Framework", filed Mar. 23, 2001, describes using a Virtual Private Network (VPN) via email to obtain data, especially when firewalls are used for security. However, configuring a firewall or other network management equipment to support a VPN is beyond the ability of most individual third parties (e.g., a gas station operator).

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for asset management systems that provide for a data exchanged between asset monitoring equipment located behind a firewall and an asset management engine.

SUMMARY OF THE INVENTION

The inventive subject matter provides apparatus, systems and methods in which one can leverage a distributed asset management system to monitor or manage assets located behind firewalls. One aspect of the inventive subject matter includes an asset management system that includes asset monitoring devices, a forwarding service, and an asset management engine. The asset monitoring device, preferably an asset monitor coupled with a device server, can be located behind a firewall and can sense a status associated with one or more assets, or other types of asset data. Example assets can include fuel, food, products, resources, or other types of items. The asset monitoring devices can send asset status messages through the firewall, preferably without requiring a VPN, reconfiguration, or alteration of the firewall, to the forwarding service. The forwarding service preferably constructs or manages a virtual tunnel through which asset status messages are passed to the asset management engine. Virtual tunnels can include an asset-side network address and a management-side network address. The asset monitoring devices can establish a communication session with the virtual tunnel by pushing a connection through the firewall to the asset-side network address of the forwarding service. Further, the forwarding service forward the asset status messages through the virtual tunnel from the management-side network address to the asset management engine having its own management engine network address. Such approaches are especially useful when the management engine is also located behind a firewall. The asset management engine aggregates the messages from the monitoring device, or other sources possibly including asset transports (e.g., trucks, tankers, ships, trains, planes, etc.). The management engine can then generate one or more alerts that can be presented on a management interface.

Various objects, features, aspects and advantages of the inventive subject matter will become more apparent from the following detailed description of preferred embodi-

DETAILED DESCRIPTION

It should be noted that while the following description is drawn to a computer/server asset management system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, or other type of packet switched network.

One should appreciate that the disclosed techniques provide many advantageous technical effects including generating one or more signals representative of asset information. The signal configures an asset management interface to render the asset information.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, within the context of this document the terms "coupled to" and "coupled with" are also used euphuistically to mean "communicatively coupled with" where to networked devices are able to communicate with each other over a network, possibly via one or more intermediary devices.

Figure 1:
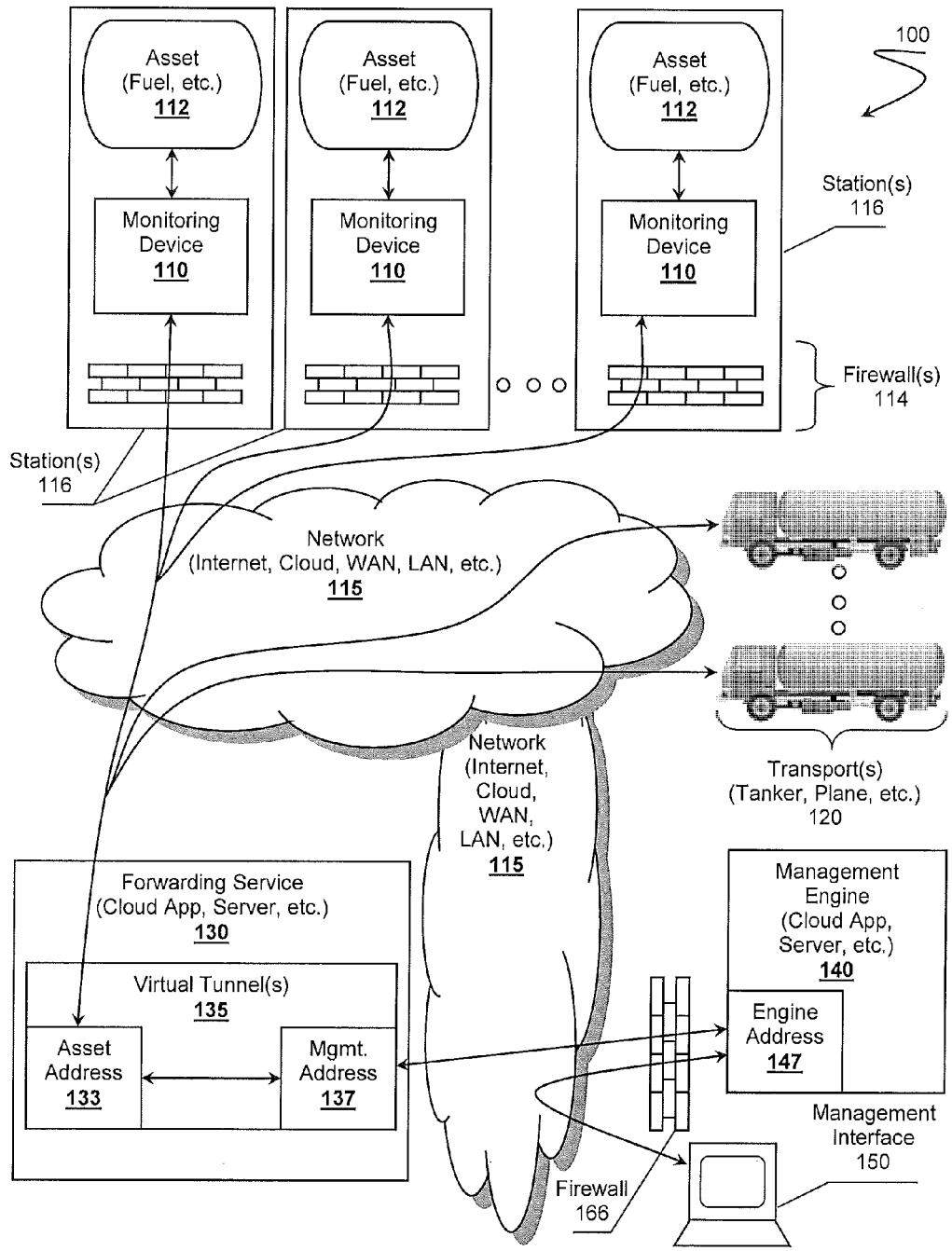
FIG. 1 is a schematic of an asset management ecosystem.

In FIG. 1 asset management ecosystem 100 is illustrated as a supply chain management system for monitoring and delivering fuel stations 116. One should appreciate that the fuel management system is presented for illustrative purposes only where fuel is considered one type of asset that can be managed. The disclosed techniques can be applied to other types of assets including food stuffs, raw resources (e.g., wood, ore, metals, oil, natural gas, grain, etc.), processed resources (e.g., fuel, break, concrete, lumbar, etc.), products, pieces of equipment, goods, people, or other types of assets that can be managed.

In ecosystem 100 assets 112 are located behind firewalls 114 within one or more of stations 116. Monitoring devices 110 are also located behind firewalls and sense the status of assets 112. It should be appreciated that each of station 116 could be independently operated or under control of different third party entities. For example, each of stations 116 could be members of a franchise, but owned by independent station owners. Stations 116 are illustrated as fueling stations (e.g., natural gas, propane, gasoline, diesel, electrical charging station, etc.). However, stations 116 simply represent a facility under control or operation of a third party.

Figure 4:
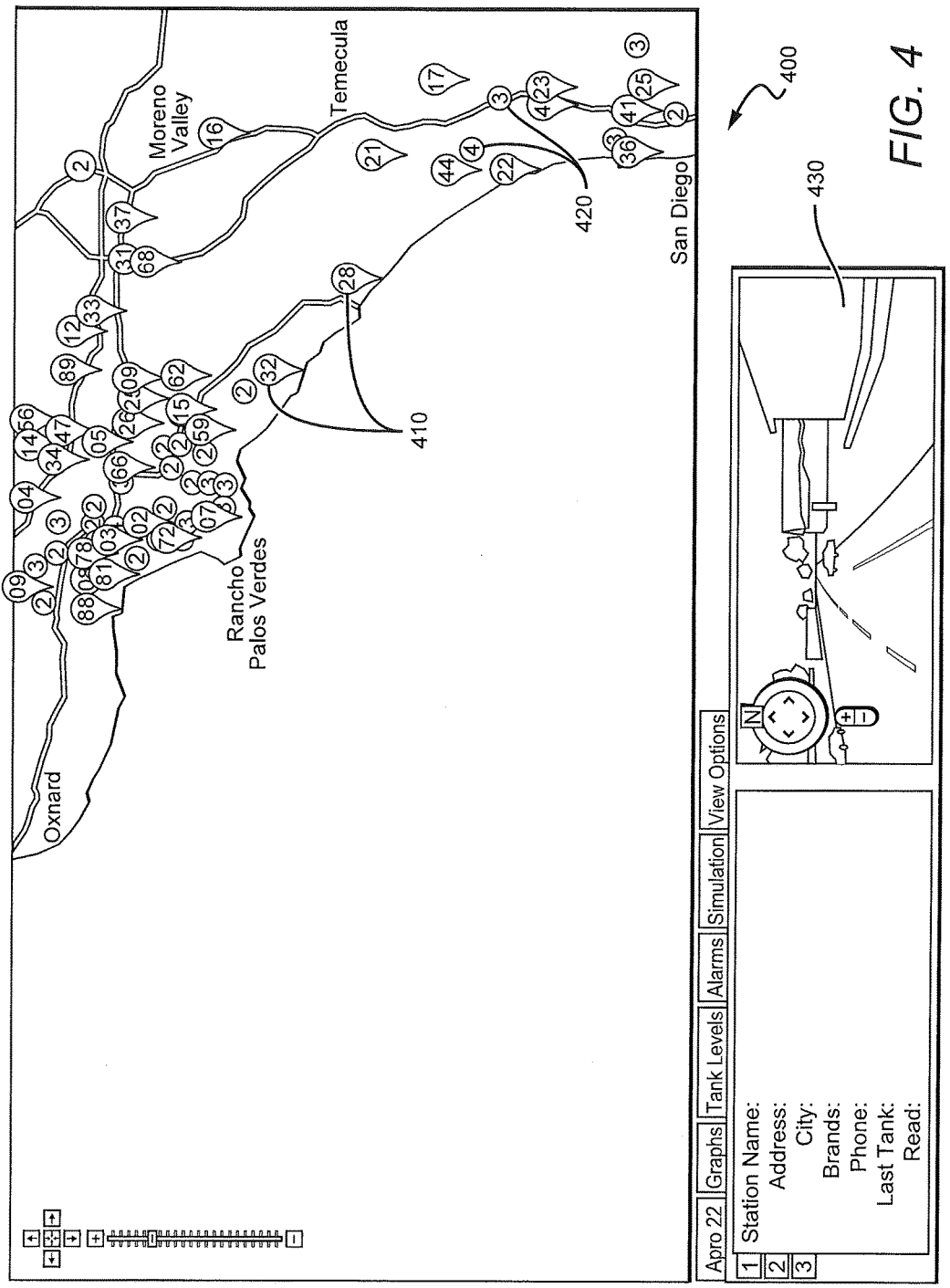
FIG. 4 is an example of an asset management interface providing asset alert information.

Asset monitoring devices 110 can be distributed geographically across a wide area where at least of two monitoring devices 110 are separated by at least 10 Km. FIG. 4 illustrates a real-world example where monitoring devices 110 are distributed across southern California. For example, devices 110 can be distributed across a city, zip codes, counties, states, provinces, countries, or other types of boundaries.

Asset monitoring device 110 comprises one or more hardware/software modules configured to acquire data representative of a status of assets 112. In the context of fueling station 116, asset monitoring device 110 could include a Veeder Root™ (see URL www.veeder.com) Automatic Tank Gage (ATG) coupled with one or more sensors to acquire sensor data related to fuel storage. Further, the ATG can be coupled with a device server that is able to package the sensor data for transmission through firewall 114. Example devices servers include those offered by Lantronix®, Inc. (see URL www.lantronix.com). For example, an ATG could incorporate an embedded device server, the Lantronix XPort® for example, capable of obtaining the sensor data via a serial connection from the ATG and transmitting the sensor data as an asset status message to remote network entities over network 115. In other embodiments, an external device server (e.g., Lantronix EDS1100 or EDS2100) could be coupled with the ATG to form monitoring devices 110. It is also possible that ATG can be outfitted with one or more wireless devices servers (e.g., Lantronix WiPort®, PremierWave®, MatchPort®, etc.). Other manufactures of device servers include Digi International® and Moxa®, whose device server products could be suitably adapted for use with the inventive subject matter. Regardless of the form that asset monitoring devices 110 take, they are preferably configured to sense the asset status and send a corresponding asset status message addresses through firewalls 114 without requiring modification of the firewalls.

Monitoring devices 110 can sense status of assets 112 associated with stations 116 or even transports 120 through one or more sensors. Example sensors can include thermometers, compasses, magnetometers, pressure sensors, piezo-electric-based sensors, GPS, accelerometers, point-of-sales devices, cameras, microphones, hall probes, or other types of sensors. The type or nature of the sensors can vary as desired depending on the type of assets 112 to be monitored. One should appreciate that monitoring devices 110 could comprise only a device server, possibly coupled with one or more sensors.

Firewalls 114 typically lock down one or more networking ports, which restrict types of traffic that can pass into stations 116 or out of stations 116. In the known art, third parties that control firewalls 114 are required to modify the configuration of firewalls 114 to allow outbound traffic to leave stations 116 or to enter stations 116, especially when proprietary communication protocols are required or when a VPN is required for securing communications through firewall 114 to external entities. In the disclosed approach, such reconfiguration or alteration of the firewall is unnecessary, and VPNs are not required.

Preferably asset monitoring devices 110 comprise one or more communication modules, a device server for example, configured to establish a communication session with management engine 140 in a seamless fashion. In a preferred embodiment, the communication modules are provisioned with an asset-side network address of forwarding service 130. Such an approach is considered advantageous because asset monitoring devices 110 can use the asset-side network address of forwarding service 130 to push an initial connection through firewalls 114. Forwarding service 130 can also establish a similar, yet distinct, connection or session with management engine 140. Thus, forwarding service 130 provides virtual tunnel 135 comprising a bi-directional communication channel through which asset monitoring devices 110 and management engine 140 can conduct a bi-directional exchange management data. Such approaches are especially advantageous when management engine 140 can also be located behind firewall 166.

Forwarding service 130 has quite a few roles and responsibilities within ecosystem. Forwarding service 130 can operate as an Internet-based or other network-based service. Preferably, forwarding service 130 operates as a for-fee service where subscribers pay a fee in exchange for gaining access to one or more of virtual tunnel 135.

Forwarding service 130 is preferably configured to instantiate or to configure one or more of virtual tunnel 135 in support of managing assets 112. Thus, forwarding service 130 and virtual tunnel 135 form an intermediary, possibly remote, conduit between monitoring devices 110 and one or more of management engine 140. Preferably virtual tunnel 135 comprises two network addresses. Asset address 133 represents an asset-side network address used by asset monitoring devices 110 to establish a connection or session with forwarding service 130. Management address 137 represents a management-side network address used by management engine 140 to establish a connection or session with forwarding service 130 over network 115. In more preferred embodiments, forwarding service 130 manages a plurality of virtual tunnels 135 as distinct manageable objects for respective clients, or for a single client.

Suitable techniques for establishing forwarding service 130 that can be adapted for use with the inventive subject matter include those disclosed in co-owned U.S. patent application publications 2010/0235481; 2010/0241762; 2011/0026531; 2011/0035470; and 2011/0035478. These references describe establishing communications with devices lacking a network-accessible IP address through construction of virtual IP addresses.

As asset status messages arrive at asset address 133, forwarding service 130 receives the message data and forwards it from management address 137 to management engine address 147. In some embodiments, forwarding service 130 operates as a pass-through filter with no modification of the data or operates in a manner that is asset status message unaware, or that is transparent to monitoring devices 110 or management engine 140. For example, in a TCP/IP connection as data streams in through a socket bound to asset address 133, the data received can then be sent out directly via socket bound to management address 137. In such a scenario, the forwarding can happen at the application layer, but could also operate at lower layers in the communication stack. Forwarding could operate at the network layer (i.e., Internet Protocol). Such an approach is advantageous because transport layer port assignments could remain intact for proprietary protocols between asset monitoring devices 110 and management engine 140. When virtual tunnel 135 operates that the IP level, it can be considered a virtual IP tunnel.

In other embodiments, forwarding service 130 could be asset status message aware and operate on the data passing through virtual tunnel 135. Such an approach can be advantageous when communications between asset monitoring device 110 and management engine 140 having timing requirements. Forwarding service 130 can then provide necessary timed responses to one side or another as necessary; a heart beat for example. Further, virtual tunnel 135 can operate on the data within the asset status messages as desired via one or more installed message handlers. Virtual tunnel 135 can route messages to one or more appropriate management engines 140 based on the contents of the massages, annotate the messages, or otherwise apply the handling rules.

Asset monitoring devices 110 are illustrated as being stationary in stations 116. However, one should appreciate that assets 112 could also transported via one or more of asset transports 120 where transports 120 are configured to submit asset status messages to management engine 140 where the messages are representative of a mobile asset 112 local to transports 120. In the context of a fuel supply chain, transports 120 could include gasoline tanker trucks. Transports 120 can include other types of vehicles including automobiles, airplanes, ships, trains, or other types of mobile transports 120. Each transport 120 can be instrumented with one or more asset monitoring devices 110 that sense assets state within transports 120. As asset data is collected, transports 120 can send corresponding asset status messages to forwarding services 130.

Transports 120 can be instrumented with device servers similar to asset monitoring devices 110. In some embodiments, the device servers can establish a communication channel with forwarding services 130 via cellular networks (e.g., GSM, CDMA, TDMA, etc.). Transports 120 do not necessarily have to address asset storage message to asset address 133 of forwarding services 130. Rather, transport 120 can transmit asset storage messages directly to engine address 147 if desired as there is likely no firewall present on transport 120. Still, engine 140 could be located behind firewall 166, in which case transport 120 might sent their messages to asset address 133.

Asset management engine 140 is preferably configured to aggregate asset status messages from asset monitoring devices 110, transports 120, or other sources. Management engine 140 generates one or more alerts as a function of the aggregated status messages. For example, as each individual message arrives, management engine 140 can update a model of ecosystem 100. Preferably, corresponding alerts are transmitted to management interface 150.

Figure 2:
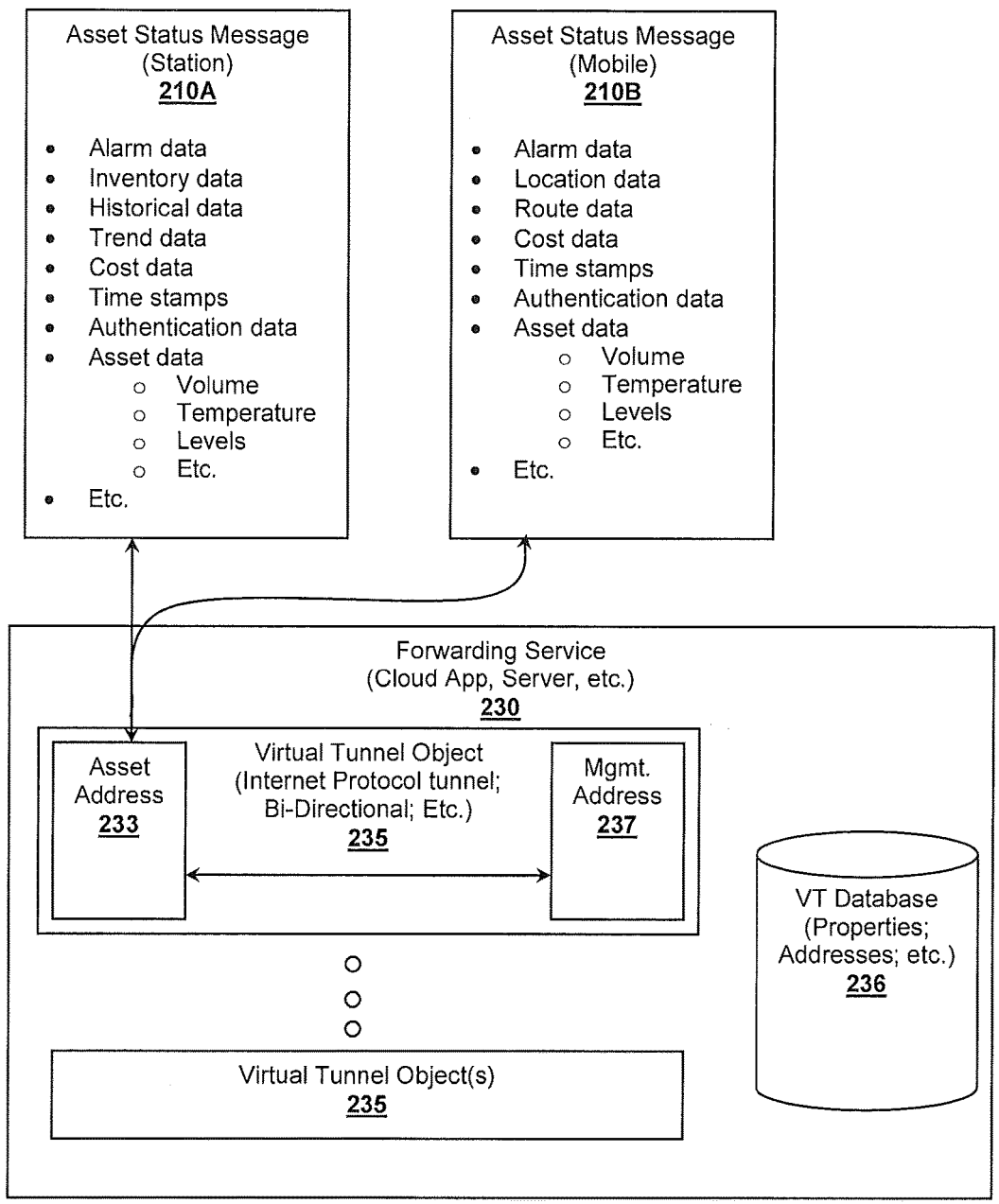
FIG. 2 is a schematic of a networked-based forwarding service utilizing virtual tunnels.

FIG. 2 presents a more detailed presentation a forwarding service as represented by forwarding service 230. Forwarding service 230 instantiates one or more of virtual tunnel object 235 as communication channel between asset address 233 and management address 237. Each virtual tunnel object 235 can be considered a separately managed, distinct object.

Information related to each of virtual tunnel object 235 is preferably stored in virtual tunnel database 236. Database 236 stores relevant information to instantiate or manage virtual tunnel object 235 including management engine network address, asset address 233, management address 237, protocol specifics if necessary, accounting or billing information, usage or logging information, or other data for management of virtual tunnel object 235.

Forwarding service 230 can be implemented on a network server, possibly a multi-homed network server or server farm capable of supporting multiple network addresses. In other embodiments, forwarding service 230 can be constructed as a cloud-based application or service. For example, forwarding service 230 can implemented on Amazon® EC2, Google® Cloud, Rackspace®, or other cloud systems. It is also contemplated that forwarding service 230 could operate as a virtual server where the virtual server hosts a single or dedicated virtual tunnel object 235.

Asset address 233 and management address 237 can take on different forms depending on the nature of forwarding service 230 or the desired capabilities of virtual tunnel object 235. In some embodiments asset address 233 or management address 237 could comprise a fixed IPv4 or IPv6 address. Thus, when an asset monitoring devices boot, they can establish a connection or session directly with the first address of asset address 233 and begin transferring asset data. Other types of addresses that can be used for asset address 233 or management address 237 comprises TCP or UDP port assignments, URLs, URIs, generic top level domain, a top level domains, phone numbers, or other networking-based addressing parameters.

Although virtual tunnel object 235 is illustrates as having a single asset address 233 and a single management address 237, it should be appreciated that virtual tunnel object 235 could include multiple of each type of address. In some scenarios, virtual tunnel object 235 might have multiple IP address for each type of address; multiple IPv4 address, multiple IPv6 address, or mix of IPv4 and IPv6 addresses. In other scenarios, the addresses could comprise a single IP address, but multiple active transport layer ports. For example, management address 237 could include the following address forms: A.B.C.D:32456; and A.B.C.D:80, where A.B.C.D represents a static IPv4 and port 32456 represents a proprietary management protocol port and port 80 represents normal HTTP traffic perhaps used for web services. In some embodiments, virtual tunnel object 235 can include multiple asset addresses 233 where each such address corresponds to an asset data source or asset monitoring device. Further, virtual tunnel object 235 can include multiple management addresses 237 that correspond to different types of management engines having different types of management responsibilities: ecosystem management, account management, billing management, routing or delivery management, logging management, analysis or modeling management, or other types of management.

Asset status messages 210A through 210B, collectively referred to as messages 210, represent possible types of messages arriving at asset address 233 from stations or mobile transports. In some embodiments messages 210 can be constructed in a serialized format, possibly based on XML, where each item of data can be tagged according to a desired management schema. For example, asset status message 210A from an asset monitoring device could be packages as an XML file having tags for alarms, inventory, history, trends, costs, time stamps, authentication (e.g., certificates, third party information, user name, keys, tokens, passwords, accounts, etc.), asset data, or other types of tags. Consider monitoring a tank level at a gas station, asset status message 210A could include corresponding XML tags similar to <TankLevel>2123 gallons</TankLevel>.

Each of asset messages 210A through 210B can be different from each other rather than following a strict structural format. Asset message 210B originates from a mobile transport and carries different information and could include current or past location data, speed, acceleration (e.g., shock, movement, etc.), heading data, route data, driver data, temperature data, or other types of data that could related to mobile transport of an asset.

Virtual tunnel object 235 can be instantiated according to various techniques. In some embodiments, as mentioned previously forwarding service 230 can be constructed as a virtual server with one or more virtual tunnel objects 235 dedicated to a specific client. Thus, when a client wishes to subscribe to the services of forwarding service 230, forwarding service 230 can be instantiated as a virtual server along with corresponding virtual tunnel objects 235 according to criteria specified by the client. For example, a client might wish to have a secured communication channel for a single virtual tunnel. In response, forwarding service 230 can be instantiated along with corresponding virtual tunnel object 235 where virtual tunnel object 235 expects to establish secure sessions or connections associated with asset address 233 or management address 237. The secure channel can be based on one or more secure protocols or algorithms, possibly including SSL, HTTPS, SSH, AES, DES, 3DES, or other secured communication techniques. The secured channel can include an end-to-end secured channel from monitoring device to management engine or include one or more secured channel segments. The connection between the asset monitoring device and the forwarding service could be secured while the connection between the forwarding service and the management agent might not be secured, for example.

Forwarding service 230 can also instantiate virtual tunnel object 235 on demand. In such scenarios, forwarding service 230 can configured to be responsive to asset address 233 before virtual tunnel object 235 exists. For example, forwarding service 230 could comprise a server farm that has numerous IP addresses, domains, URLs, or other network addresses ready to receive communications. When a first asset status message 210 is received, forward service can inspect the data within the asset status message to determine how to construct virtual tunnel object 235. Asset status messages 210 can include authentication or authorization data indicate the purpose or owner of the data; a key, token, identification, or other information. Forwarding service 230 uses the identification formation from asset status message 210 to consult virtual tunnel database 236 to determine the properties of a corresponding virtual tunnel object 235 and instantiate virtual tunnel object 235 accordingly. The same insanitation process can also be based on communications received at management address 237 from the asset management engine.

In embodiments where forwarding service 230 receives a high rate of asset status messages 210 at asset address 233, forwarding service 230 can employ one or more load balancing techniques. Traditional load balancing can be used across real or virtual servers in forwarding service 230 as desired. For example, forwarding service 230 can apply a round robin technique. In such cases, the inventive subject matter is considered to include instantiating one or more of virtual tunnel object 235 according to load of asset status messages 210 and to a desired load balancing technique (e.g., round robin, first come first serve, priority, urgency, etc.). Further, asset status messages 210 can be load balanced based on content in the messages: priority data, urgency data, authorization data, authentication data, source (e.g., station identifier, store identifier, originating address, etc.), alarm data, or other data. Thus, forwarding service 230 can instantiate one or more of load balancing virtual tunnel objects 235 as a function of the content in asset status messages 210.

Yet another possible trigger for instantiation or configuration of virtual tunnel object 235 can be based on transport layer port assignments. Such an approach is considered useful when a proprietary protocol is used to exchange asset data or management data between asset monitoring devices and the management engine. When management data is received at forwarding service 230 via asset address 233 or management address 237, forwarding service 230 identifies the port assignments in the transport layer header (e.g., TCP header, UDP header, etc.). Forwarding service 230 can again consult virtual tunnel database 236 to look up the parameters associated with instantiating or configuring virtual tunnel object 235 based on the identified port assignments. For example, based on the source or destination address forwarding service 230 can determine ownership of virtual tunnel object 235 and based on the port assignments forwarding service 230 can determine the operational nature of the communication channel (e.g., protocol, security, monitoring, logging, etc.) of virtual tunnel object 235.

In operation, virtual tunnel object 235 is likely instantiated a priori before asset data is transferred between asset monitoring devices and the asset management engine to ensure a communication channel exists. Virtual tunnel object 235 can be instantiated or configured based on preferences of a client in control of the asset management ecosystem. Still, information in asset status messages 210 or in messages from the asset management engine can configure virtual tunnel object 235. In some embodiments, virtual tunnel object 235 comprises one or more Application Program Interfaces (APIs); possibly via a web service, RPC, HTTP, or other technique, that can be responsive to the content of messages 210 or information in the message packets.

One should appreciate that virtual tunnel objects 235 can persist or exist independent of monitoring device or management engine connections or communication exchanges. As sessions or connections are created or dropped, forwarding service 230 can maintain virtual tunnel object 235 as necessary in support of many different activities. For example, virtual tunnel object 235 can persist in anticipation of further sessions or communications from a client, monitoring devices, or management engines. Additionally, virtual tunnel object 235 can also maintain persistence to allow for testing of the communication channel or possible installed message handlers, to allow management of virtual tunnel object 235, or other activities.

Configuration of virtual tunnel object 235 can include a broad spectrum of capabilities. Example configuration can include one or more of the following operations applied to virtual tunnel object 235: instantiate or de-instantiate virtual tunnel object 235, pausing operation, resuming operation, stopping operation, starting operation, replicating data from asset status messages 210, controlling encryption of data, cloning or spawning virtual tunnel object 235, routing data, load balancing operation, changing asset address 233 or management address 237, querying usage data of virtual tunnel object 235, changing properties in virtual tunnel database 236, applying filters to asset status messages 210, applying functions to asset status messages 210, installing asset message handlers that operate on data with asset status messages 210, or other types of configurations. Clients or other managers of virtual tunnel object 235 can configure manage virtual tunnel object 235 via one or more virtual tunnel management interfaces: web interfaces, APIs, the asset management interface, etc.

Once virtual tunnel object 235 is instantiated or configured for desirable operation, forwarding service 230 is able to route asset status messages 210, or content related to the messages, based on information associated with the asset status message. For example, as asset status messages 210 arrive at one or more of asset address 233, forwarding service 230 inspects the messages to determine how best to route or forward the message on to the management engine. Routing of the messages can be based one or more of the following conditions: the asset address at which the messages arrive, a port assignment, urgency, a priority, a type of message, a source, or other information that can be encoded in the asset status message. Thus, forwarding service 230 can route messages 210 to specific transport layer ports of the management engine, to different management engines, or other destinations.

Figure 3:
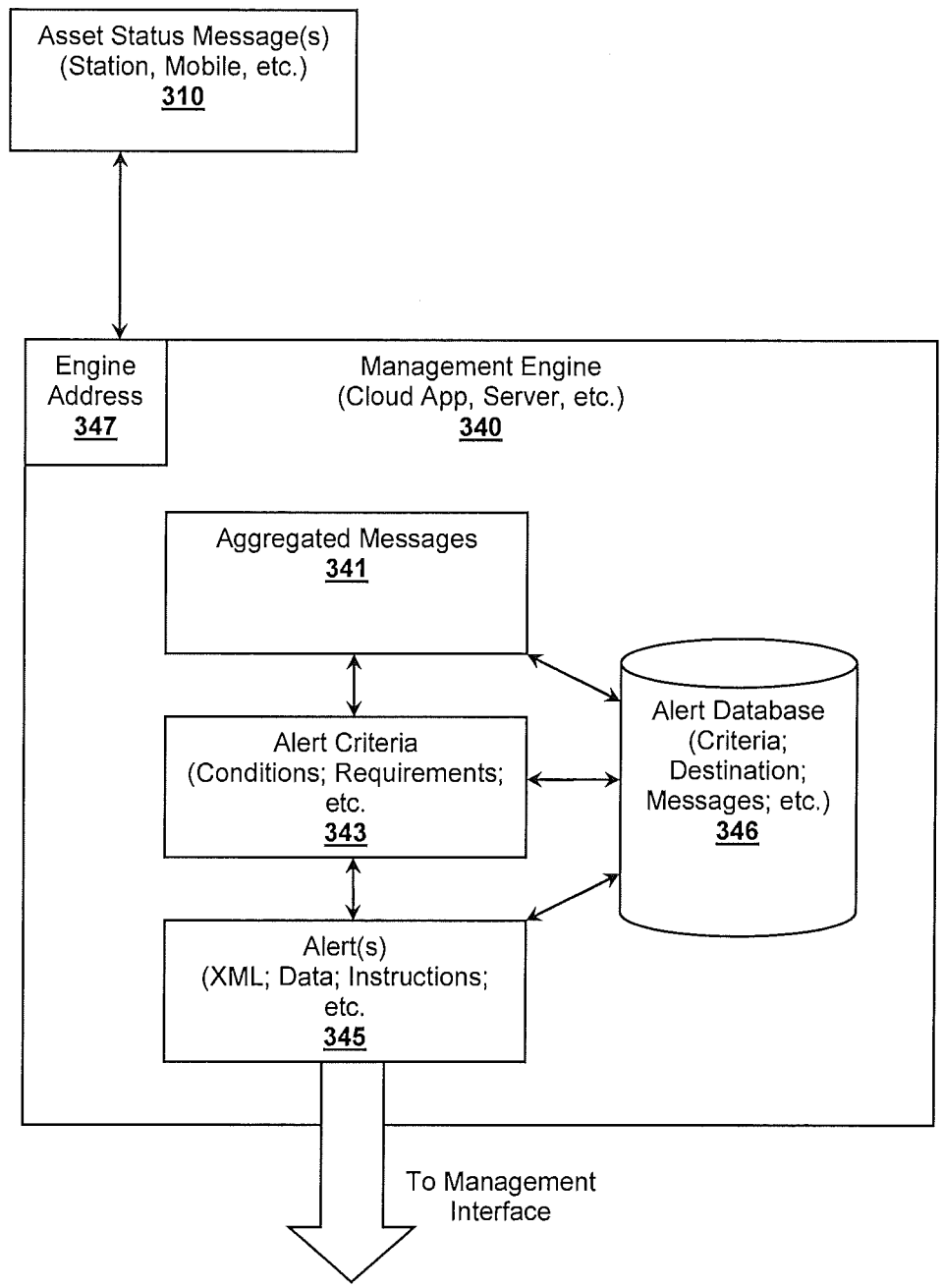
FIG. 3 is a schematic of an asset management engine.

FIG. 3 illustrates a flow of asset status messages 310 through one or more of management engine 340. One should appreciate that asset management engine 340 is illustrated as a comprehensive management engine configured to manage an entire asset management ecosystem. However, asset management engine 340 is also considered to represent a specific type of asset management engine. For example, asset management engine 340 could be dedicated to handling billing or accounting related to the assets referenced in asset status messages 310. Alternatively, asset management engine 340 could be dedicated to dispatching of one or more mobile transports carrying assets.

Asset management engine 340 is also illustrated as a single entity. However, in some embodiments, management engine 340 can comprise one or more computing devices operating alone or in concert. Example computing devices that can operate as management engine 340 include cloud-based applications, web servers, application servers, virtual servers, computers with management applications, or other computing devices. It is also contemplated that management engine 340 could also comprise a mobile device including a cell phone, tablet, or other type of mobile device.

Management engine 340 obtains asset status messages 310 from a forwarding service and addressed to management engine address 347. As with other addresses in the ecosystem, engine address 347 can also comprise various forms of network addresses possibly including IPv4 addresses, IPv6 addresses, port assignments, URLs, URIs, domains, phone numbers, or other form of network address.

Management engine 340 aggregates asset status messages 310 to form aggregated messages 341. Aggregated messages 341 are illustrated to euphemistically represent a collected set of asset data or other data from the ecosystem. The data set can include current state information, current status information, historical data, trend data, location data, or other types of data as desired.

Management engine 340 compares data within aggregated messages 341 to alert criteria 343 to determine if one or more alerts 345 should be generated and sent to a management interface. Alert criteria 343, or other alert properties, are preferably stored within alert database 346. Alert criteria 343 can include one or more criterion that depend on required or optional conditions with respect to the data. For example, alert criteria 343 might require that at least 70% of all tank levels fall below a minimum threshold as a required condition, and might optionally include information related to a specific franchise if available.

Alert database 346 can also include additional information associated with alerts. Examples include alert messages, alert data, notification information, destination of alerts, instructions for a management interface, or other information. When alert 345 is generated by management engine 340, it can include the information obtained from database 346. For example, if aggregated messages 341 indicate that one or more mobile transports are delayed in delivering assets, management engine 340 can consult database 346 to determine an urgency of alert 345, then consult an alert escalation table to determine an appropriate a destination address for the urgent alert (e.g., a phone number, management interface address, etc.).

Alert 345 comprises data constructed from aggregate messages 341 or alert database 346, and can be constructed according to many different formats. In more preferred embodiments, alert 345 can include an XML data stream encoding the data. Still, other formats are also contemplated including binary, HTML, HTML5, Flash, or other encodings. It some embodiments, alert 345 comprises instructions or commands targeting a management interface. Once prepared, management engine 340 can transmit alert 345 to the management interface. Transmission can include sending email, sending the XML data stream, triggering a phone call, calling a local or remote API, or other techniques.

One should appreciate that alert 345 is termed an "alert" to illustrate that information is sent for consumption by a management interface regardless if the information is rendered for a user's consumption. Thus, alert 345 could include raw information that merely provides information to management interface, but does not necessarily become a visual or auditory alert to a user. For example, alert 345 could include pre-cached data or instructions that configure the management interface. Therefore, alerts 345 can include a spectrum of alert types. Especially preferred types of alerts include real-time alerts that substantially reflect information obtained from monitoring device or transports. More preferably the real-time alerts have a latency of less than 15 seconds from the time an asset message is received at management engine 340.

Of particular note, management engine 340 can also be located behind a firewall. For example, personal computer or tablet can operate as both management engine 340 and management interface, but be located behind a firewall. Management engine 340 can establish a connection or session with the forwarding service, which allows the engine 340 to communicate with one or more monitoring devices via a virtual tunnel. Thus, both management engine 340 and the monitoring devices can exchange data with each other while both being located behind different firewalls.

Figure 5:
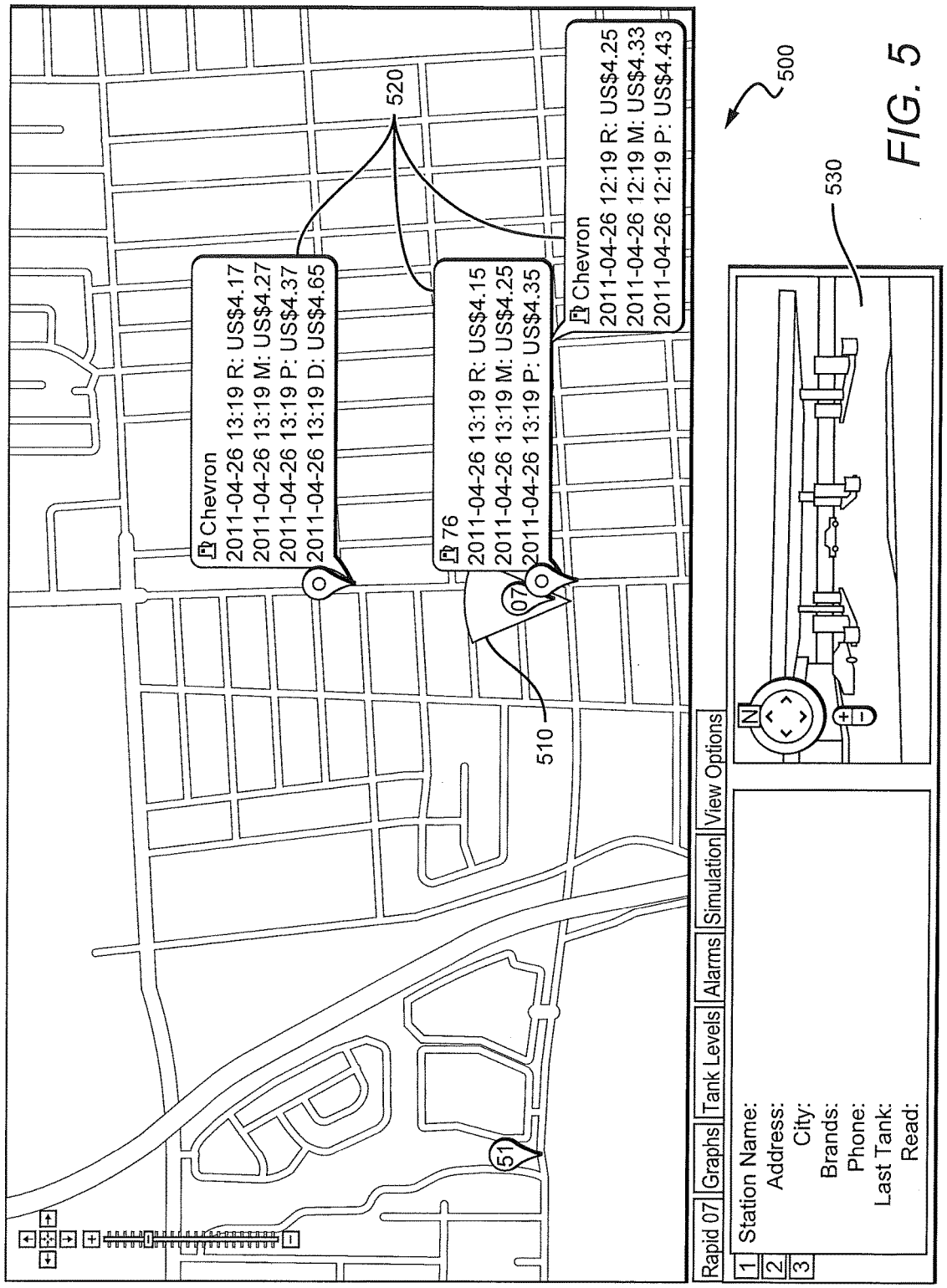
FIG. 5 is an example of an asset management interface providing competitor information.

FIGS. 4 and 5 present example management interfaces 400 and 500 in the context of a fuel delivery and management ecosystem. Management interfaces 400 and 500 can be implemented based on various technologies including HTML5, Javascript, AJAX, browsers, or other technologies.

Management interface 400 comprises a web-browser based mash-up of Google® maps with asset status information aggregated by a cloud-based management engine. Tear drop shaped monitoring sites 410 represent gasoline stations and each site 410 displays information associated with the corresponding station. For example, each site 410 can be labeled with an identifier showing a station number, color coded to show a tank level, blinking to show urgency, or other information aggregated from asset status messages. Circular transport 420 represent tanker trucks traveling the roads making deliveries or being dispatched from a depot. Each of transport 420 can also be labeled with information obtained from assets status messages obtained from the mobile transports. Note that transport 420 positioned on the map based on location information, time information, quantity or inventory information, heading information, or other pertinent information. Still further, interface 400 also focuses on a specific site 410, or a specific transport 420 and can present street view 430 from the site's or transport's position.

Management interface 500 focuses on specific monitoring site 510. In this example, site 510 corresponds to a gasoline station on Pacific Cost Highway as illustrated by street view 530. Of particular interest, management interface 500 can obtain asset data from other sources beyond monitoring site 510 or transport, including competitor data as illustrated by competitors 520. The competitor information can include competitor identifier, time stamps, costs or prices, trends, locations, or other competitor information.

Management interfaces 400 and 500 could display a vast array of information relating to fuel located at sites 410, transports 420, or sites 510. One example of asset data can include alarms generated by asset monitoring devices, possibly including alarm categories, time stamps, alarm type, sensor category, station number, tank number, cleared alarms, or alarm state. Another type of asset data can include tank information, possibly including tank volume, height, product code, station number, status, temperature, volume, water present, water volume, tank alarms, start or end values, tank number, or other tank related information. Still further asset data can include information related to transports 420 including GPS location, driver, destination, heading, route or path, schedule, traffic information, or other data.

Management interfaces 400 and 500 are presented as web interfaces via a browser. It is also contemplated that a management interface can include one or more APIs, possibly web-based APIs. Such an approach allows a management interface to be local or remote relative the management engine. In some embodiments, the management engine comprises the management interface. Still further management interface can comprises one or more computing devices: a cell phone, a computer, a tablet, an application specific device, or other type of device. It is also contemplated that management interface could comprise a voice-based interface allowing a user to control the management engine or interface via voice-based command using techniques known in the art such as those employed by Siri®.

One should appreciate that the disclosed techniques allow dissemination of asset data between monitoring devices and management engines even across firewalls without requiring reconfiguration or alteration of the firewalls. A third party can simply install a network-enabled monitoring device at their location. The monitoring device establishes connections with a forwarding service, which in turn establishes a virtual tunnel comprising a communication channel. Data from the monitoring devices can flow through the virtual tunnel to a management engine even when the management engine is located behind a different firewall.

Although the above techniques are disclosed with respect to a fuel management and distribution system, one should appreciate that the techniques can be readily applied to other markets beyond fuel distribution without deviating from the inventive subject matter. Examples include managing products within vending machines located behind firewalls, vendor managed inventory systems, managing medical records or medical sensor data among health care providers, or other types of systems.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An asset management system comprising:
   a plurality of asset monitoring devices located behind firewalls under control of different third party entities, each monitoring device configured to sense an asset status of an asset;
   a device server configured to receive the asset status of the asset from the monitoring device;
   a forwarding service implemented on a network server, the forwarding service including an asset-side network address configured to receive an asset status message representative of the asset status of the asset through the firewall, and a management-side network address configured to receive the asset status message from the asset-side network address through a virtual tunnel; and
   an asset management engine in communication with the management-side network address, the asset management engine configured to receive the asset status message and to compare data within the asset status message to criteria stored within an alert database to determine if an alert should be generated.

2. The system of claim 1, wherein the asset status message reflects a status of at least one of the following: a fuel, a food stuff, a resource, a temperature, and a piece of equipment.

3. The system of claim 1, wherein the asset management engine is further configured to transmit the alert to a management interface.

4. The system of claim 1, wherein the forwarding service comprises a cloud-based service.

5. The system of claim 1, wherein the asset-side network address comprises at least one of the following: a fixed network address, a URL, and a domain.

6. The system of claim 1, wherein the management-side network address comprises at least one of the following: a fixed network address, a URL, and a domain.

7. The system of claim 1, wherein the asset monitoring device lacks a requirement to alter the firewall behavior to transmit the asset status message to the asset-side network address.

8. The system of claim 1, wherein asset status message communications between the asset monitoring device and the management engine via the forwarding services lacks a requirement for a Virtual Private Network (VPN).

9. The system of claim 1, wherein at least one of the plurality of asset monitoring devices located behind firewalls is disposed on an asset transport wherein the asset status message is representative of a mobile asset local to the asset transport.

10. The system of claim 9, wherein the mobile asset status message comprises at least one of the following types of data: a location, a position, a heading, a quantity, and a cost.

11. The system of claim 1, wherein the asset status message comprises at least one of the follow types of data: competitor data, cost data, inventory data, account data, and alert data.

12. The system of claim 1, wherein the management interface comprises a web interface.

13. The system of claim 1, wherein the management interface comprises an API.

14. The system of claim 1, wherein the management interface comprises at least one of the following: a cell phone, a computer, a tablet, an application, and a voice-based interface.

15. The system of claim 1, wherein the asset management engine comprises the forwarding service.

16. The system of claim 1, wherein the virtual tunnel comprises a bi-directional data exchange channel between the management engine and the asset monitoring device.

17. The system of claim 1, wherein the virtual tunnel comprises a secured tunnel.

18. The system of claim 1, wherein the forwarding service is configured to manage a plurality of distinct virtual tunnel objects, each object representative of a separately managed virtual tunnel.

19. The system of claim 18, wherein the forwarding service is configured to provide access to the virtual tunnel objects in exchange for a fee.

20. The system of claim 1, wherein the asset monitoring devices are geographically distributed.

21. The system of claim 1, wherein the forwarding service is further configured to control traffic comprised of incoming asset status messages using a load balancing technique.

22. The system of claim 21, wherein the load balancing technique is based on one or more criteria selected from the group consisting of message content, message priority, message urgency, authorization data contained in the message, authentication data contained in the message, message source, and alarm data contained in the message.

23. The system of claim 22, wherein the message source may reflect at least one of the group consisting of a station identifier, store identifier, and an originating address.

24. The system of claim 1 further comprising a virtual tunnel database, the virtual tunnel database including parameters associated with configuring the virtual tunnel stored in the virtual tunnel database.

25. The system of claim 24, wherein the forwarding service is configured to identify port assignments in the transport layer header of the asset status message.

26. The system of claim 25, wherein the forwarding service is configured to configure the virtual tunnel in accordance with parameters stored in the virtual tunnel databased related to the identified port assignments.

* * * * *